Sept. 16, 1924.
G. HUFF
LEASH HARNESS FOR DOGS
Filed July 3, 1922
1,508,601
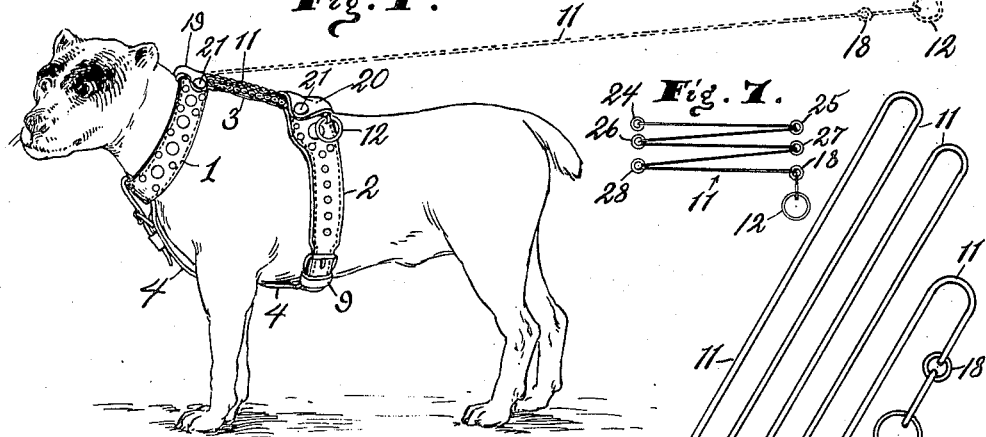
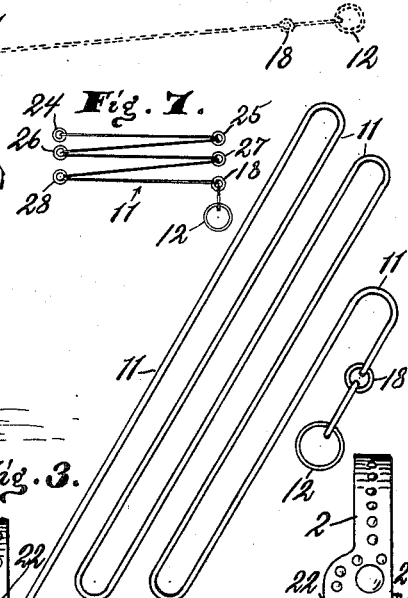
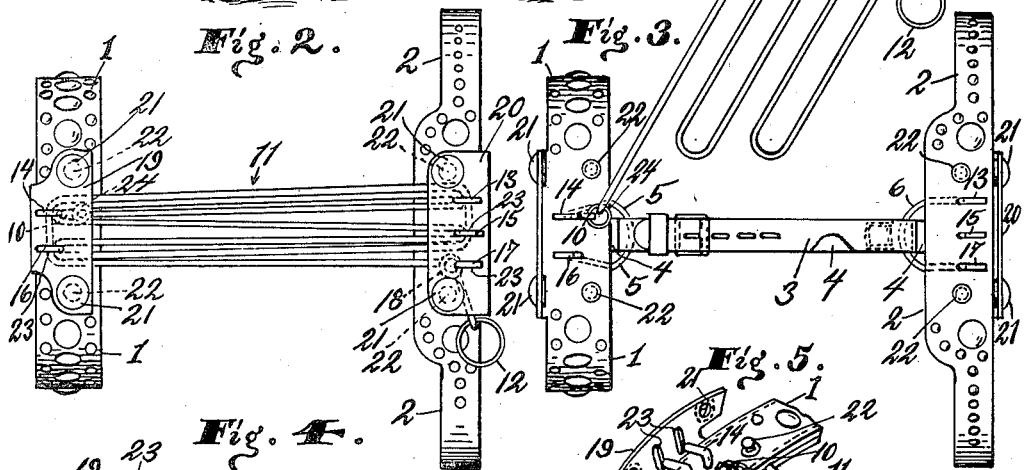
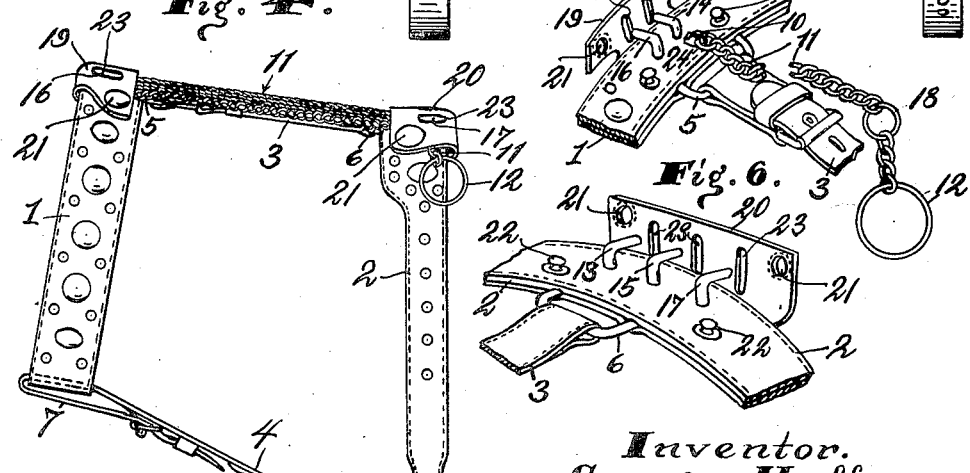
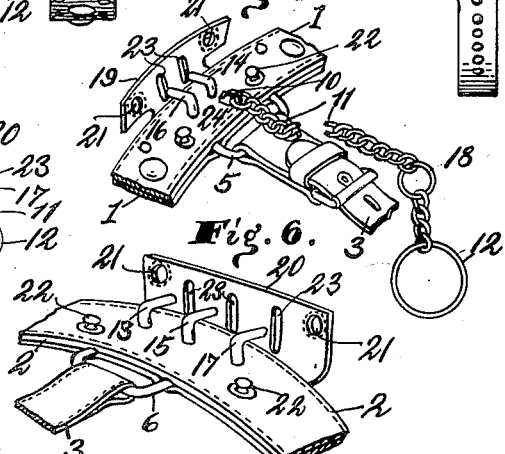
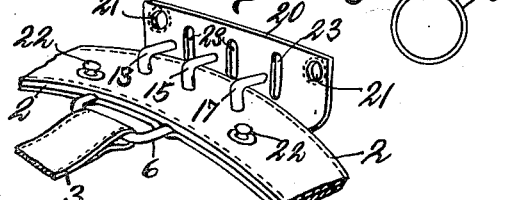
Witness:
W. M. Gentle.
Inventor.
George Huff.
by James R. Townsend
his atty.

Patented Sept. 16, 1924.

1,508,601

UNITED STATES PATENT OFFICE.

GEORGE HUFF, OF GLENDALE, CALIFORNIA.

LEASH HARNESS FOR DOGS.

Application filed July 3, 1922. Serial No. 572,578.

*To all whom it may concern:*

Be it known that I, GEORGE HUFF, a citizen of the United States, residing at Glendale, in the county of Los Angeles and State of California, have invented a new and useful Leash Harness for Dogs, of which the following is a specification.

An object of this invention is to provide simple, light, attractive, durable and convenient means for leading, holding and freeing a dog with minimum impediment to the dog either when held or led or when freed.

The invention comprises a harness for dogs provided with a leash, lead line or chain that can be used to hold a dog, and with means whereby the leash when not in such use may be stored as a part of the harness and will not interfere with free movement of the dog in running and playing; and which will not be likely to become tangled, caught or broken.

An object of the invention is to provide a practical substitute for detachable pocket chains and the like intended for controlling dogs in crowded thoroughfares or other places and which have to be detached when the dog is allowed its freedom.

An object is to provide more desirable means for storing the leash line to free the animal.

Other objects, advantages and features of invention may appear from the accompanying drawing, the subjoined detailed description and the appended claims.

The accompanying drawing illustrates the invention.

Figure 1 is a perspective view of the harness with leash stored: dotted lines indicate the leash in use.

Fig. 2 is a plan view of the harness without back and breast bands; showing the leash line connecting the collar and saddle.

Fig. 3 is a plan of the harness provided with back and breast straps; and showing the leash line uncoiled.

Fig. 4 is a perspective view of the harness showing the leash chain stored.

Fig. 5 is a fragmental perspective view of a portion of a harness collar with the flaps for holding the leash chain in open position.

Fig. 6 is a fragmental perspective view of the harness saddle with the flaps for holding the leash line in open position.

Fig. 7 is a diagrammatic view of a leash line provided with retaining rings for attaching the line to the harness.

The collar 1 and saddle 2 are preferably connected by the adjustable back band 3 and breast strap 4; and these parts can be constructed and ornamented in any desired way.

The collar 1 and saddle 2 are provided with semi-circular extensions 5, 6, over which the ends of the back band are looped and secured; so that the collar has considerable free turning movement relative to the saddle and so that a harnessed dog can freely turn his head. The breast band 4 has its ends 7, 8, looped over the collar 1 and the belly band 9 of saddle 2, so that there is a loose connection of the parts that enables a dog to turn and move freely.

The saddle 2 and belly band 9 constitutes a belt fitting around the body of the animal, while the collar 1 fits around the neck of the animal.

On the uppermost part of collar 1 is an eyelet 10 to which is connected one end of a leash line 11. This line may be a chain as shown in Figs. 1, 4, 5; or a cord, rope or string as indicated in Figs. 2 and 3, or a thong as indicated in Fig. 7; and it has its free end provided with a hand ring 12. The leash line 11 may be of any appropriate length.

Hooks, 13, 14, 15, 16 and 17 are retaining means provided in the collar and the saddle of the belt upon which the leash line is trained by looping the leash line around said retaining means when the animal is to be given its freedom. The leash line when stored or coiled around the retaining means connects the collar and saddle.

The leash line is shortened into a coil fitted over the spaced hooks 14, 16 of collar 1 and hooks 13, 15, 17 of saddle 2; and preferably the coil is arranged as follows:—The leash line is first extended rearwardly over the saddle 2 and turned to the left side of the dog to engage the hook 13; then it is brought forward over the collar and turned to the right to engage the hook 14; then rearward and turned to the right to engage the hook 15; then forward and turned to the right to engage the hook 16; then rearward and to the left to engage both of the hooks 15, 13; then forward and turned to the right to engage both of the hooks 14, 16; then rearward to engage the retaining ring 18 with hook 17.

Means are provided for maintaining the leash line 11 in engagement with the hooks when thus coiled. On the collar 1 and saddle 2 there are secured flaps 19, 20 that are provided with the socket members 21 that are adapted to engage the buttons 22 and normally hold the flaps in position so that the coils of leash line 11 can not escape from the retaining hooks 13, 14, 15, 16, 17, until the flaps 19, 20 are released by disengaging the clasps comprising the members 21, 33.

Slots 23 are preferably provided in the flaps 19, 20 in position to receive the hooks 13, 14, 15, 16, 17 when the flaps are in closed position.

If desired the leash line 11 can be provided with spaced rings as shown in Fig. 7, that are adapted to engage the hooks on the collar and saddle when the line is stored on the harness. That is, when the line is provided with retaining rings and is to be so arranged in unextended position on the harness, it is adjusted as follows:—Assuming that the ring 24, Fig. 7, is attached to eyelet 10; then the line would be extended rearwardly and ring 25 attached to hook 13; then the line would be brought forward and ring 26 connected to hook 14; then rearwardly and ring 27 connected to hook 15; then forward and the ring 28 connected to hook 16; then rearward and ring 18 connected to hook 17.

In practice the leash line is connected and coiled as arranged on the harness as described; so that it is in unextended position in which it will not interfere with the free movement of a dog wearing the harness; and when a dog is to be restrained or held under leash the leash line is released from the hooks, as many of them as desired, so that it will be extended the required length.

I claim.

1. A harness for dogs comprising a collar; a saddle; and a leash line connected to said collar and saddle.

2. A harness for dogs comprising a collar and a saddle; and a leash line connected to said collar and saddle and means on the collar for temporarily holding the leash line stored on and forming a part of the harness.

3. A harness for dogs comprising a collar; an eyelet secured to said collar; a leash line having one end connected to said eyelet; a saddle; and means for detachably connecting said leash line to said saddle and collar to store the leash line.

4. A harness for dogs comprising a collar; an eyelet secured to said collar; a leash line having one end connected to said eyelet; a saddle; hooks on said collar and saddle said hooks arranged to hold said leash line when it is in unextended position; and means for retaining said leash line in unextended position on said hooks.

5. The harness for dogs comprising a collar; an eyelet secured to said collar; a leash line having one end connected to said eyelet; a saddle; hooks on said collar and saddle said hooks arranged to hold said leash line when it is in unextended position; and flaps for holding said leash line in unextended position on said hooks.

6. The harness for dogs set forth comprising a collar, a saddle; a leash line, and means carried by said saddle and collar to hold the leash line in stored position.

7. The harness for dogs set forth comprising a collar, a saddle; a leash line; means carried by said saddle and collar to hold the leash line in stored position; flaps adapted to cover said means and means for fastening the flaps in covering position.

8. In a dog harness comprising a collar and a saddle; a leash line fastened to the collar; and means on the collar and saddle for storing the leash line and said leash line connecting the collar and saddle when stored.

9. In a dog harness comprising a collar and a saddle; a leash line fastened to the collar; means on the collar and saddle for storing the leash line and said leash line connecting the collar and saddle when stored; and flaps on the collar and saddle adapted to conceal the leash line holders.

10. A dog harness comprising a collar and a belt; a leash line fastened on the collar and retainers on the collar and belt around which the leash line may be looped, the leash line being adapted to be caught upon and held by said retaining means.

In testimony whereof, I have hereunto set my hand at Los Angeles, California, this 23rd day of June, 1922.

.GEORGE HUFF.

Witness:
JAMES R. TOWNSEND.